(12) United States Patent
Nakamura et al.

(10) Patent No.: US 9,166,450 B2
(45) Date of Patent: Oct. 20, 2015

(54) PERMANENT MAGNET ROTOR

(75) Inventors: Masashi Nakamura, Tokyo (JP); Hirohisa Yokota, Tokyo (JP); Shogo Okamoto, Tokyo (JP); Masaya Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 84 days.

(21) Appl. No.: 13/423,691

(22) Filed: Mar. 19, 2012

(65) Prior Publication Data

US 2013/0069468 A1 Mar. 21, 2013

(30) Foreign Application Priority Data

Sep. 21, 2011 (JP) .................. 2011-205722

(51) Int. Cl.
*H02K 1/28* (2006.01)
*H02K 1/27* (2006.01)

(52) U.S. Cl.
CPC . *H02K 1/276* (2013.01); *H02K 1/28* (2013.01)

(58) Field of Classification Search
CPC ...................................................... H02K 1/28
USPC ............ 310/156.53, 156.56, 156.72, 156.74, 310/156.75, 156.77, 156.16, 156.19, 310/156.17, 156.18, 156.21, 156.22, 310/156.23, 156.24, 156.25, 156.26, 310/156.27, 156.28, 156.29, 156.31
See application file for complete search history.

(56) References Cited

U.S. PATENT DOCUMENTS 3,181,018 A * 4/1965 Shafranek et al. ........ 310/156.77
3,286,110 A * 11/1966 Pintar ...................... 310/156.77
4,393,320 A * 7/1983 Anderson ................ 310/156.77
7,262,579 B1 * 8/2007 Shepard ........................ 318/810
7,579,744 B2 * 8/2009 Kato .............................. 310/268
7,687,957 B2 * 3/2010 Ochiai et al. ............. 310/156.08
7,836,575 B2 * 11/2010 Groendahl et al. ............. 29/596
2006/0091752 A1 * 5/2006 Adaniya et al. .......... 310/156.16

(Continued)

FOREIGN PATENT DOCUMENTS

EP       1420501 A2 *  5/2004
JP     05-083892 A     4/1993
JP    2002247784 A *  8/2002

(Continued)

OTHER PUBLICATIONS

Chinese Office Action, Application No. 2012100996973; Issued Jun. 30, 2014.

(Continued)

*Primary Examiner* — John K Kim
*Assistant Examiner* — Robert E Mates
(74) *Attorney, Agent, or Firm* — Sughrue Mion, PLLC; Richard C. Turner

(57) ABSTRACT

A permanent magnet rotor has a rotor core positioned about a rotation shaft. The permanent magnet rotor also has permanent magnet embedment slots located at equally spaced positions from the rotation shaft, with permanent magnets inserted into each of the respective permanent magnet embedment slots. The permanent magnet embedment slots each have both a magnet storing portion, and a buffer and other members storing portion which extends to the magnet storing portion. Once a permanent magnet is stored inside the magnet storing portion, a buffer member, and a pushing member are used to secure the permanent magnet inside the rotor core.

10 Claims, 8 Drawing Sheets

(56) References Cited

U.S. PATENT DOCUMENTS

| | | | |
|---|---|---|---|
| 2009/0079285 A1* | 3/2009 | Koumura | 310/156.16 |
| 2009/0096308 A1* | 4/2009 | Staudenmann | 310/156.08 |

FOREIGN PATENT DOCUMENTS

| | | | |
|---|---|---|---|
| JP | 2004343842 A | * | 12/2004 |
| JP | 2005-020819 A | | 1/2005 |
| JP | 2005328664 A | * | 11/2005 |
| JP | 2006136088 A | * | 5/2006 |
| JP | 2008-148365 A | | 6/2008 |
| JP | 2011125115 A | * | 6/2011 |

OTHER PUBLICATIONS

Communication dated Mar. 13, 2015, issued by the State Intellectual Property Office of the People's Republic of China in counterpart Application No. 201210099697.3.

* cited by examiner

PERMANENT MAGNET ROTOR

BACKGROUND OF THE INVENTION

1. Field of the Invention

The present invention relates to a permanent magnet rotor (hereinafter, referred to also simply as the rotor) formed by inserting a permanent magnet (hereinafter, referred to also simply as the magnet) into a rotor of an electric motor.

2. Background Art

To obtain a permanent magnet rotor by inserting a permanent magnet into an internal slot of an electric motor rotor and fixing the magnet therein, an adhesive, such as epoxy resin, may be applied between the internal slot and the magnet and cured to fix the magnet. However, this method requires a thermal curing process to cure the adhesive and admits of improvement in terms of mass-production. As an alternative, there is proposed a method that eliminates the need of a complex process by providing a groove in an inner peripheral portion of the internal slot and inserting a magnet fixing metal split pin into the groove after a permanent magnet is inserted into the slot. An example is described in Patent Document 1.
Patent Document 1: JP-A-5-83892

The structure of Patent Document 1, however, may damage the magnet because the metal split pin hits against the magnet when the magnet and the split pin vibrate due to resonance. Because the electric motor incorporated into an automobile, in particular, undergoes vibrations of the vehicle and the engine, it is preferable to reduce vibrations of the magnet. Vibrations may be reduced by inserting a buffer member, such as rubber, instead of the metal split pin. Strong friction of the rubber, however, makes it difficult to press-fit the rubber into the slot. This alternative therefore requires an arrangement to insert the rubber while letting the rubber undergo elastic deformation by applying an external force to the rubber and has a problem that the process becomes complex.

SUMMARY OF THE INVENTION

The invention was devised to solve the problems discussed above and has an object to provide a permanent magnet rotor capable of not only preventing damage on a permanent magnet by reducing resonance even when the magnet resonates under a vibration condition, but also enhancing mass-productivity by making a process involving magnet fixation simpler.

A permanent magnet rotor according to an aspect of the invention includes: a rotor core of a laminated structure about a rotation shaft; a plurality of permanent magnet embedment slots provided to the rotor core at equally spaced positions from the rotation shaft; and permanent magnets inserted into the respective permanent magnet embedment slots. Each of the permanent magnet embedment slots has a magnet storing portion and a buffer and other members storing portion continuing to the magnet storing portion. One permanent magnet is stored in the magnet storing portion and a buffer member and a pushing member used to fix the permanent magnet are stored in the buffer and other members storing portion.

When configured in this manner, it becomes possible to attenuate vibrations of the magnet. Hence, damage on the magnet caused by vibrations can be prevented. Also, because the parts necessary for fixation are of a simple shape, an assembling process becomes simple, too. Consequently, the permanent magnet rotor can be mass-produced at a low cost. The foregoing and other object, features, aspects, and advantages of the present invention will become more apparent from the following detailed description of the present invention when taken conjunction with the accompanying drawings.

DESCRIPTION OF THE PREFERRED EMBODIMENTS

First Embodiment

Figure 1:
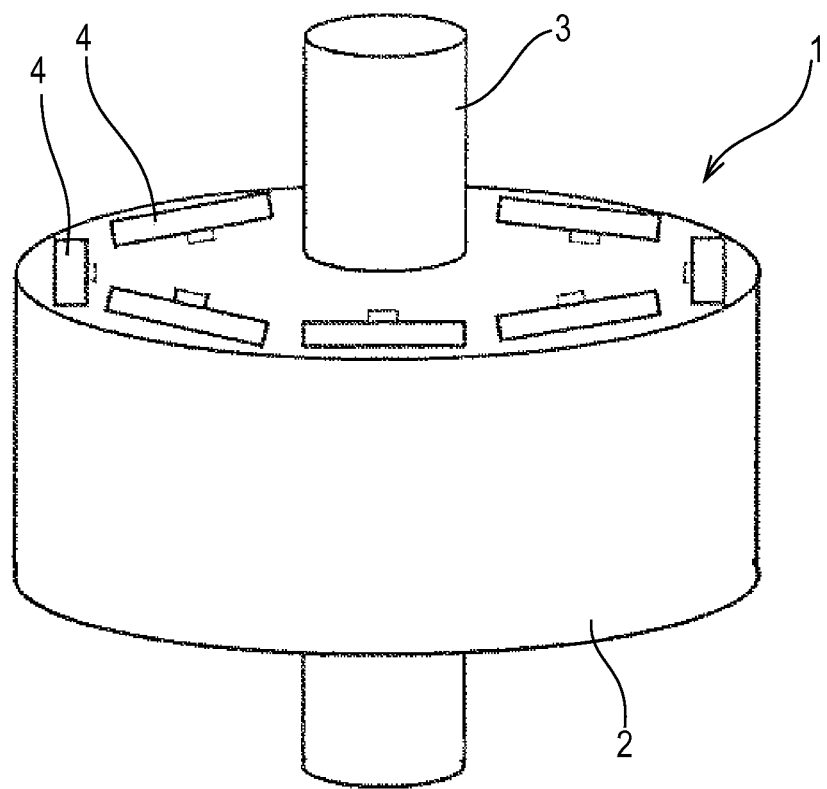
FIG. 1 is a perspective view of a permanent magnet rotor of the invention.

FIG. 1 is a perspective view of a permanent magnet rotor 1 of the invention. The rotor 1 is formed by fixedly fitting a rotor core 2 to a rotation shaft 3. The rotor core 2 is formed by laminating plates of a magnetic material, such as silicon steel plates, punched out by a mold. The rotor core 2 is provided with a plurality of permanent magnet embedment slots (hereinafter, referred to simply as the magnet embedment slots or slots) 4 to embed permanent magnets. The magnet embedment slots 4 are provided parallel to the shaft 3 at equally spaced positions closer to an outer periphery.

Figure 2:
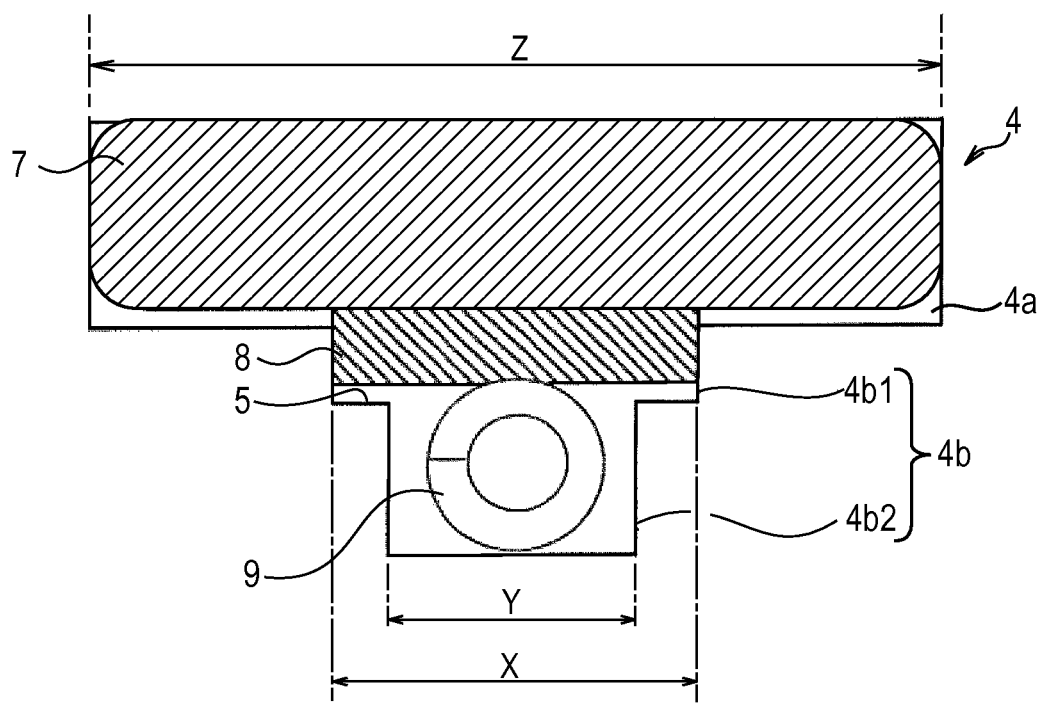
FIG. 2 is a front view showing a periphery of a magnet embedment slot in a permanent magnet rotor according to a first embodiment of the invention.

FIG. 2 is a detailed view on a periphery of the magnet embedment slot 4. The magnet embedment slot 4 is formed of a magnet storing portion 4a in a rectangular shape comforting to a shape of a magnet and a buffer and other members storing portion 4b continuing to the magnet storing portion 4a at substantially the center of a long side of the magnet storing portion 4a. The magnet storing portion 4a and the buffer and other members storing portion 4b are formed simultaneously by punching. The buffer and other members storing portion 4b is formed of a wide near side 4b1 close to the magnet storing portion 4a and a slightly narrow far side 4b2 far from the magnet storing portion 4a. A step 5 is formed at the boundary of the near side 4b1 and the far side 4b2.

Let X and Y be respectively a width of the near side 4b1 and a width of the far side 4b2 of the buffer and other members storing portion 4b, and Z be a length of the long side of the magnet storing portion 4a. Then, X is set to about 1/10 or less of Z so as to lessen a drop in magnetic force of a permanent magnet 7. Also, Y is set slightly shorter than X so as to form the step 5. The near side 4b1 is deep enough to store a buffer member described below with allowance and the far side 4*b*2 is deep enough to store a pushing member described below.

The magnet 7 having a substantially rectangular cross section is inserted into the magnet storing portion 4*a* of the magnet embedment slot 4. A plate-shaped buffer member 8 is inserted on the near side 4*b*1 of the buffer and other members storing portion 4*b* of the magnet embedment slot 4. An elastic material, such as rubber, is desirable as the buffer member 8. Further, a pushing member 9, which is, for example, a split pin made of resin or metal, is press-fit on the far side 4*b*2 of the buffer and other members storing portion 4*b* of the magnet embedment slot 4. Generally, the pushing member 9 is made of a material harder than the buffer member 8. The pushing member 9 having a length in a direction parallel to the rotation shaft 3 (hereinafter, referred to as the axial length) shorter than the axial length of the buffer member 8 is used. The reason for this length setting is to prevent a fall-off of the pushing member 9 by allowing the pushing member 9 to edge into the buffer member 8. Owing to the configuration above, the magnet 7 is firmly fixed inside the magnet storing portion 4*a* by the buffer member 8 and the pushing member 9. Because the buffer member 8 made of an elastic member absorbs rattling and a dimensional tolerance, the magnet 7 is prevented from an impact. The magnet 7 becomes more stable when the width of the magnet 7 is adjusted to Z, that is, the width of the magnet storing portion 4*a*.

Figures 3A, 3B, 3C:
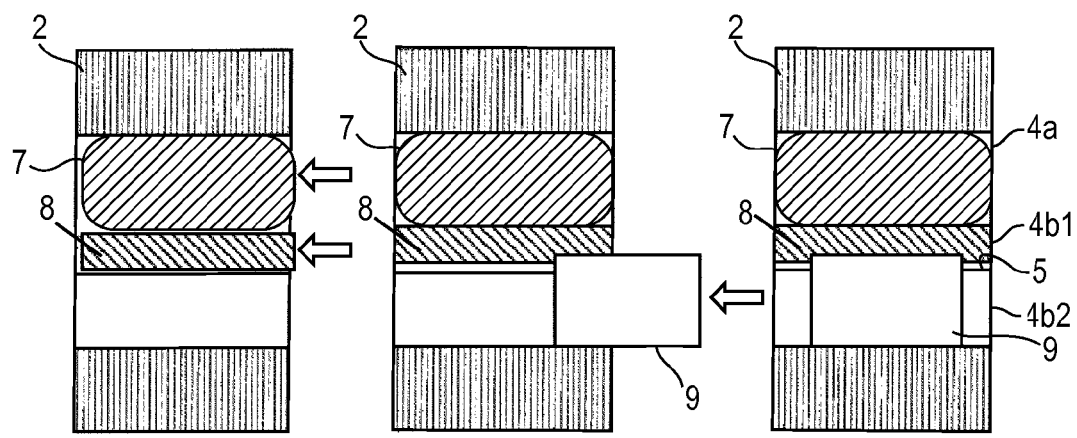
FIGS. 3A through 3C are cross sections parallel to a rotation axis direction on the periphery of the magnet embedment slot to show an order of magnet insertion into the magnet embedment slot of the first embodiment.

An order of insertion of the respective members will now be described. FIGS. 3A through 3C are views showing a manner in which the respective members are inserted. Referring to FIG. 3A, the magnet 7 is inserted into the magnet storing portion 4*a* first and then the buffer member 8 is inserted into the buffer and other members storing portion 4*b* on the step 5. During this insertion, the step 5 serves as a guide for the buffer member 8 and the buffer member 8 is readily positioned. Thereafter, as are shown in FIGS. 3B and 3C, the pushing member 9 is press-fit beneath the buffer member 8 up to the center of the rotation core 2. Consequently, the buffer member 8 is compressed and stretched by deformation in the width direction of the near side 4*b*1 to be firmly fixed onto a side surface of the near side 4*b*1. Hence, the magnet 7 does not incline even when a load (moment load) such that forces the magnet 7 to incline with respect to the magnet storing portion 4*a* is applied to the magnet 7. The magnet 7 is fixed by pushing forces of the buffer member 8 and the pushing member 9. Because the pushing member 9 is not in direct contact with the magnet 7, the pushing member 9 does not damage the surface of the magnet 7 during insertion. As is shown in FIG. 3C, after the pushing member 9 is inserted, the both ends of the pushing member 9 edge into the buffer member 8. Accordingly, a fall-off of the pushing member 9 is prevented.

According to the first embodiment, it becomes possible to achieve a magnet fixing structure inside the slot merely by a process as simple as punching out the rotor core first and then inserting the magnet, the buffer member, and the like in lamination. Also, because the magnet 7 is fixed by the buffer member 8 and the pushing member 9, it becomes possible to prevent damage on the magnet 7 by attenuating vibrations due to resonance. Further, by forming the buffer member 8 in a dimension to make allowance for the buffer and other members storing portion 4*b*, the buffer member 8 comes into contact with the buffer and other members storing portion 4*b* in a smaller area when the buffer member 8 is inserted therein. Hence, not only can the buffer member 8 be inserted readily, but also the pushing member 9 can be inserted with ease.

Second Embodiment

Figure 4:
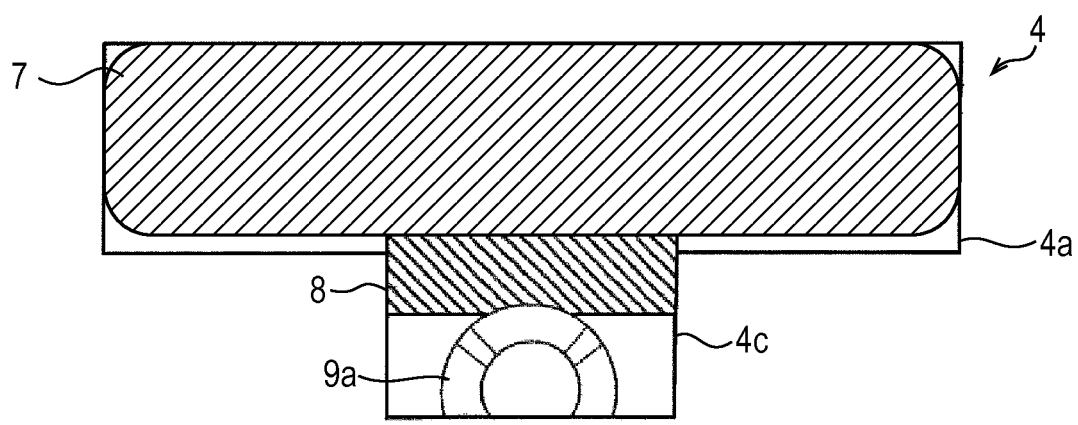
FIG. 4 is a front view showing a periphery of a magnet embedment slot in a permanent magnet rotor according to a second embodiment of the invention.

FIG. 4 through FIG. 6D show a second embodiment of the invention and members in common with FIG. 1 through FIG. 3C are labeled with the same reference numerals. A difference of a permanent magnet rotor of the second embodiment from the counterpart of the first embodiment above is the pushing member. As is shown in FIG. 4, a magnet embedment slot 4 in the permanent magnet rotor of the second embodiment is formed of a magnet storing portion 4*a* in a rectangular shape conforming to a shape of a permanent magnet 7 and a rectangular buffer and other members storing portion 4*c* continuing to the magnet storing portion 4*a* substantially at the center of a long side of the magnet storing portion 4*a*. The magnet storing portion 4*a* and the buffer and other members storing portion 4*c* are formed simultaneously by punching. The buffer and other members storing portion 4*c* is of a rectangular shape herein. It should be appreciated, however, that the buffer and other members storing portion 4*c* may be of a shape provided with a step as in the first embodiment above. A width of the buffer and other members storing portion 4*c* is set to about 1/10 or less of a length of a long direction of the magnet storing portion 4*a*10 to lessen a drop in magnetic force of the magnet 7.

The magnet 7 is inserted into the magnet storing portion 4*a* of the magnet embedment slot 4. In order to support and fix the magnet 7 from below, a plate-like buffer member 8 made, for example, of rubber and a pushing member 9*a* made of elastic metal, for example, spring steel are inserted into the buffer and other members storing portion 4*c*.

As are shown in FIGS. 6A through 6D used for description below, the buffer member 8 made of rubber in a plate shape is formed to have an axial length shorter than an axial length of the magnet 7. Meanwhile, as are shown in the perspective view of FIGS. 5A and 5B, the pushing member 9*a* made of elastic metal is of a gutter shape having substantially a semicircular cross section and provided with two lines of cuts 9*c* at each end so that tabs 9*b* are formed at the both ends. An axial length of the pushing member 9*a* is set longer than an axial length of the buffer member 8 so that the both ends of the buffer member 8 are sandwiched by the tabs 9*b*.

Figure 5A:
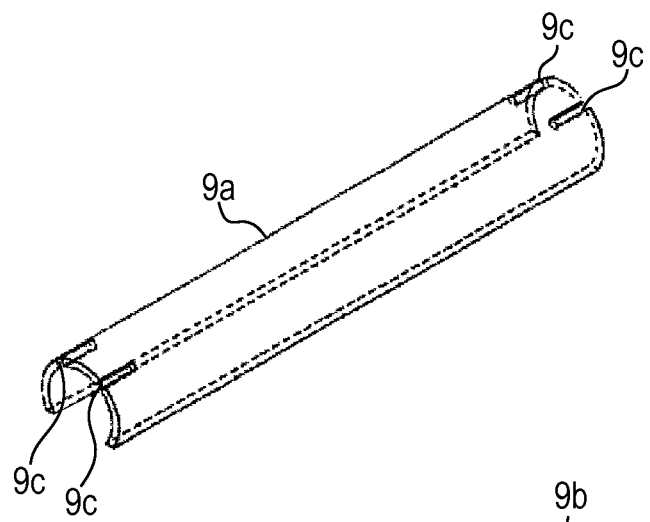
FIGS. 5A and 5B are perspective views of a pushing member used in the second embodiment.
Figure 5B:
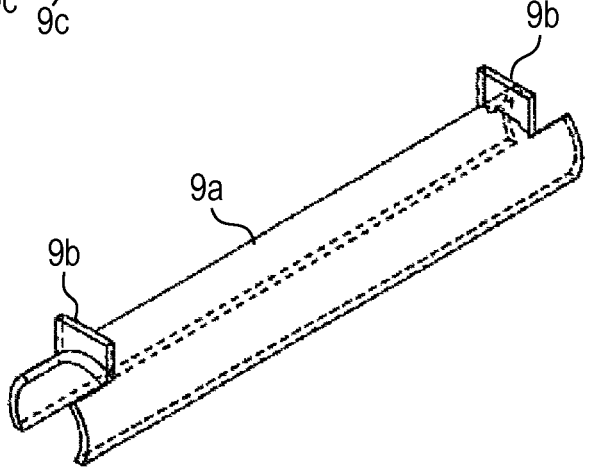
Figures 6A, 6B, 6C, 6D:
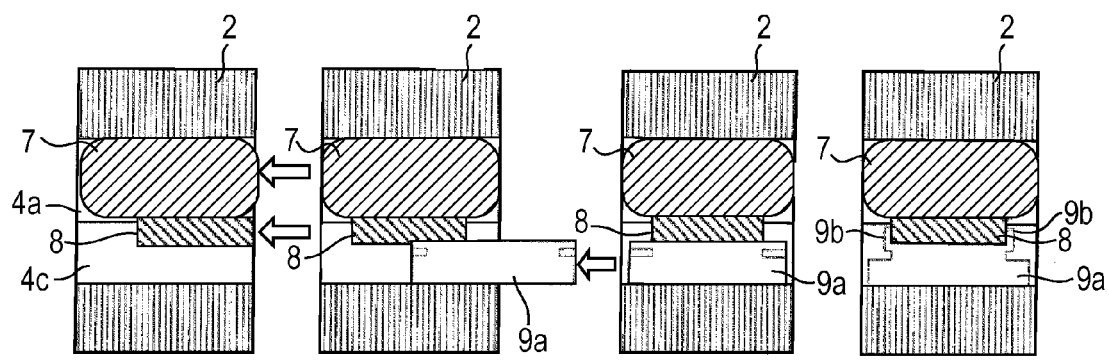
FIGS. 6A through 6D are cross sections parallel to a rotation axis direction on a periphery of a magnet embedment slot to show an order of magnet insertion into the magnet embedment slot of the second embodiment.

An order of insertion of the respective members will now be described. FIG. 6A through FIG. 6D show a manner in which the respective members are inserted. Referring to FIG. 6A, the magnet 7 is inserted into the magnet storing portion 4*a* of the magnet embedment slot 4 first and thence the buffer member 8 is inserted into the buffer and other members storing portion 4*c*. Thereafter, as are shown in FIGS. 6B and 6C, the pushing member 9*a* is press-fit therein up to the axial center of the rotor core 2. Consequently, the buffer member 8 is compressed and stretched by deformation in the width direction of the buffer and other members storing portion 4*c* to be firmly fixed onto a side surface of the buffer and other members storing portion 4*c*. The magnet 7 is thus fixed by a pushing force. Further, referring to FIG. 6D, the both ends of the pushing member 9*a* are cut and bent upright so as to fix the buffer member 8 by sandwiching the buffer member 8 from the both sides between the tabs 9*b*. When configured in this manner, because the pushing member 9*a* sandwiches the buffer member 8, it becomes possible to prevent a fall-off and positional displacement of these members. FIG. 4 and FIG. 5A are views of the pushing member 9*a* before the tabs 9*b* are formed. FIG. 5B and FIG. 6D are views of the pushing member 9*a* after the tab 9*b* are formed.

According to the second embodiment, in addition to the advantage in common with the first embodiment above, it becomes possible to obtain a more stable vibration-resistant rotor because a fall-off and positional displacement of the buffer member 8 and the pushing member 9a can be prevented by sandwiching the former by the latter.

Third Embodiment

Figure 7:
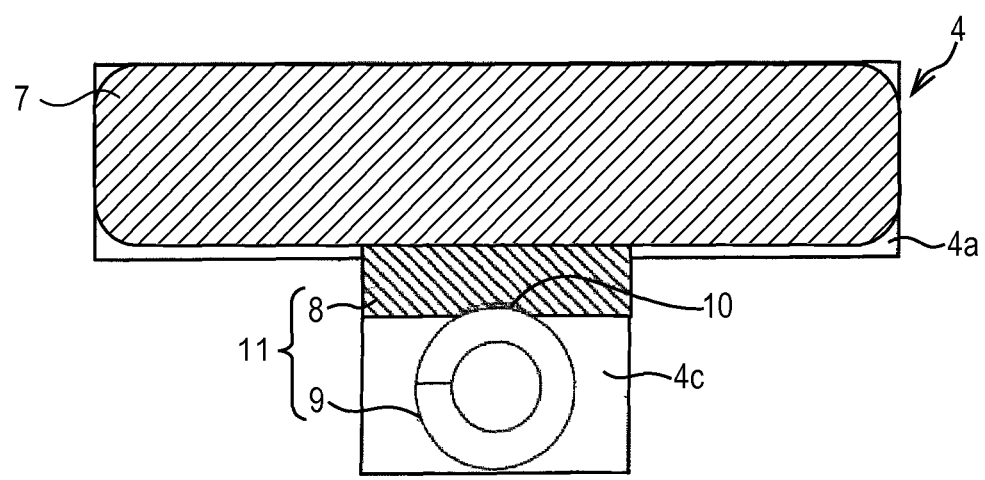
FIG. 7 is a front view showing a periphery of a magnet embedment slot in a permanent magnet rotor according to a third embodiment of the invention.

FIG. 7 and FIGS. 8A through 8C show a periphery of a magnet embedment slot 4 in a permanent magnet rotor of a third embodiment. In the first and second embodiments above, the buffer member 8 and the pushing member 9 or 9a are separate parts, and when assembled, the pushing member 9 or 9a is inserted into the buffer and other members storing portion 4c after the buffer member 8 is inserted therein. On the contrary, the third embodiment uses a buffer and pushing member 11 prepared by making a plate-shaped buffer member 8 and a pushing member 9, which is a resin or metal split pin, into one piece with an adhesive 10. The rest of the configuration is the same as the configuration of the first or second embodiment above, and a description is omitted by labeling the common components with the same reference numerals. Referring to FIG. 7, the buffer and the pushing member 11 is formed of the pushing member 9 in the shape of a split pin and the buffer member 8. It should be appreciated, however, that the same advantage can be obtained when the buffer and pushing member 11 is formed by making the pushing member 9a of a gutter shape shown in FIG. 5 and the buffer member 8 into one piece.

Figures 8A, 8B, 8C:
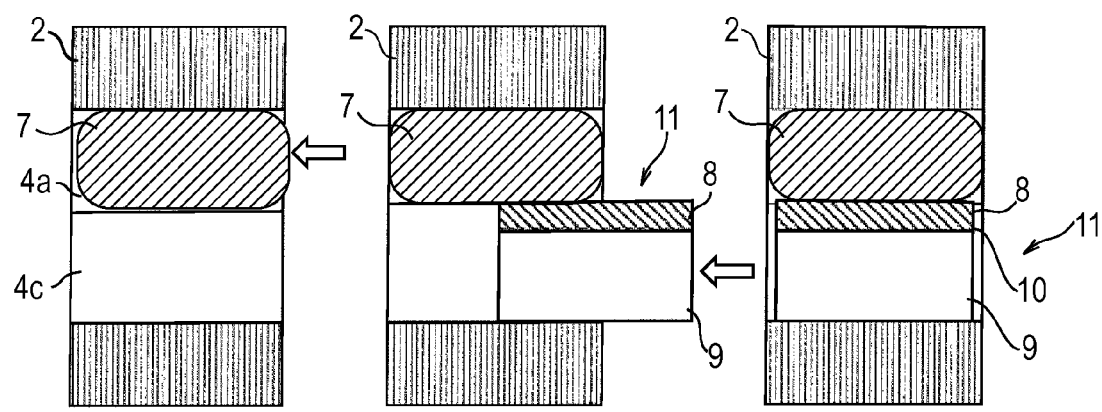
FIGS. 8A through 8C are cross sections parallel to a rotation axis direction on the periphery of the magnet embedment slot to show an order of magnet insertion into the magnet embedment slot of the third embodiment.

An order of insertion of the respective members will now be described with reference to FIGS. 8A through 8C. Referring to FIG. 8A, a permanent magnet 7 is inserted into a magnet storing portion 4a of the magnet embedment slot 4 first and thence the buffer and pushing member 11 is press-fit into a buffer and other members storing portion 4c. Consequently, the buffer member 8 is compressed and stretched by deformation in the width direction of the buffer and other members storing portion 4c to be firmly fixed onto a side surface of the buffer and other members storing portion 4c. The magnet 7 is therefore fixed by a pushing force of the buffer and the pushing member 11.

According to the third embodiment, in addition to the advantage in common with the first and the second embodiments above, it becomes possible to obtain a permanent magnet rotor with excellent mass-productivity by reducing the number of complex inserting steps of the buffer member and the pushing member.

Various modifications and alterations of this invention will be apparent to those skilled in the art without departing from the scope and spirit of this invention, and it should be understood that this is not limited to the illustrative embodiments set forth herein.

What is claimed is:

1. A permanent magnet rotor, comprising:
a rotor core of a laminated structure about a rotation shaft;
a plurality of permanent magnet embedment slots provided to the rotor core at equally spaced positions; and
permanent magnets inserted into the respective permanent magnet embedment slots,
wherein:
each of the permanent magnet embedment slots has a magnet storing portion, a first step, and a buffer and other members storing portion extending radially inwardly from the magnet storing portion and the first step;
the buffer and other members storing portion comprising a first area and a second area separated by a second step, the second area contiguous with and external to the first area,
wherein one permanent magnet is stored in the magnet storing portion, and a buffer member and a pushing member used to fix the permanent magnet are respectively stored in the first area and the second area, and
wherein the buffer and other members storing portion is formed of a first area having a first width narrower than the magnet storing portion and a second area having a second width narrower than the first width via a step.

2. The permanent magnet rotor according to claim 1, wherein:
the buffer member is stored in the first area and the pushing member is stored in the second area in the buffer and other members storing portion.

3. A permanent magnet rotor, comprising:
a rotor core of a laminated structure about a rotation shaft;
a plurality of permanent magnet embedment slots provided to the rotor core at equally spaced positions; and
permanent magnets inserted into the respective permanent magnet embedment slots,
wherein:
each of the permanent magnet embedment slots has a magnet storing portion, a first step, and a buffer and other members storing portion extending radially inwardly from the magnet storing portion and the first step;
the buffer and other members storing portion comprising a first area and a second area separated by a second step, the second area contiguous with and external to the first area,
wherein one permanent magnet is stored in the magnet storing portion, and a buffer member and a pushing member used to fix the permanent magnet are respectively stored in the first area and the second area, and
wherein:
a width of the buffer and other members storing portion is $1/10$ or less of a width of the magnet storing portion.

4. A permanent magnet rotor, comprising:
a rotor core of a laminated structure about a rotation shaft;
a plurality of permanent magnet embedment slots provided to the rotor core at equally spaced positions; and
permanent magnets inserted into the respective permanent magnet embedment slots,
wherein:
each of the permanent magnet embedment slots has a magnet storing portion, a first step, and a buffer and other members storing portion extending radially inwardly from the magnet storing portion and the first step;
the buffer and other members storing portion comprising a first area and a second area separated by a second step, the second area contiguous with and external to the first area,
wherein one permanent magnet is stored in the magnet storing portion, and a buffer member and a pushing member used to fix the permanent magnet are respectively stored in the first area and the second area, and
wherein:
the buffer member is interposed between the permanent magnet and the pushing member.

5. The permanent magnet rotor according to claim 1, wherein:
the buffer member is made of an elastic material.

6. A permanent magnet rotor, comprising:
a rotor core of a laminated structure about a rotation shaft;
a plurality of permanent magnet embedment slots provided to the rotor core at equally spaced positions; and
permanent magnets inserted into the respective permanent magnet embedment slots,
wherein:
each of the permanent magnet embedment slots has a magnet storing portion, a first step, and a buffer and other members storing portion extending radially inwardly from the magnet storing portion and the first step;
the buffer and other members storing portion comprising a first area and a second area separated by a second step, the second area contiguous with and external to the first area,
wherein one permanent magnet is stored in the magnet storing portion, and a buffer member and a pushing member used to fix the permanent magnet are respectively stored in the first area and the second area, and
wherein:
the buffer member is of substantially a plate shape.

7. A permanent magnet rotor, comprising:
a rotor core of a laminated structure about a rotation shaft;
a plurality of permanent magnet embedment slots provided to the rotor core at equally spaced positions; and
permanent magnets inserted into the respective permanent magnet embedment slots,
wherein:
each of the permanent magnet embedment slots has a magnet storing portion, a first step, and a buffer and other members storing portion extending radially inwardly from the magnet storing portion and the first step;
the buffer and other members storing portion comprising a first area and a second area separated by a second step, the second area contiguous with and external to the first area,
wherein one permanent magnet is stored in the magnet storing portion, and a buffer member and a pushing member used to fix the permanent magnet are respectively stored in the first area and the second area, and
wherein:
the buffer member includes a first end face and a second end face that are in contact with a side surface of the buffer and other members storing portion.

8. A permanent magnet rotor, comprising:
a rotor core of a laminated structure about a rotation shaft;
a plurality of permanent magnet embedment slots provided to the rotor core at equally spaced positions; and
permanent magnets inserted into the respective permanent magnet embedment slots,
wherein:
each of the permanent magnet embedment slots has a magnet storing portion, a first step, and a buffer and other members storing portion extending radially inwardly from the magnet storing portion and the first step;
the buffer and other members storing portion comprising a first area and a second area separated by a second step, the second area contiguous with and external to the first area,
wherein one permanent magnet is stored in the magnet storing portion, and a buffer member and a pushing member used to fix the permanent magnet are respectively stored in the first area and the second area, and
wherein:
an axial length of the pushing member is shorter than an axial length of the buffer member and the buffer member is formed of a material softer than a material of the pushing member.

9. A permanent magnet rotor, comprising:
a rotor core of a laminated structure about a rotation shaft;
a plurality of permanent magnet embedment slots provided to the rotor core at equally spaced positions; and
permanent magnets inserted into the respective permanent magnet embedment slots,
wherein:
each of the permanent magnet embedment slots has a magnet storing portion, a first step, and a buffer and other members storing portion extending radially inwardly from the magnet storing portion and the first step;
the buffer and other members storing portion comprising a first area and a second area separated by a second step, the second area contiguous with and external to the first area,
wherein one permanent magnet is stored in the magnet storing portion, and a buffer member and a pushing member used to fix the permanent magnet are respectively stored in the first area and the second area, and
wherein:
the pushing member is provided with cuts used to form a tab at each end of the pushing member, so that tabs formed along the cuts support the buffer member from both sides.

10. A permanent magnet rotor, comprising:
a rotor core of a laminated structure about a rotation shaft;
a plurality of permanent magnet embedment slots provided to the rotor core at equally spaced positions; and
permanent magnets inserted into the respective permanent magnet embedment slots,
wherein:
each of the permanent magnet embedment slots has a magnet storing portion, a first step, and a buffer and other members storing portion extending radially inwardly from the magnet storing portion and the first step;
the buffer and other members storing portion comprising a first area and a second area separated by a second step, the second area contiguous with and external to the first area,
wherein one permanent magnet is stored in the magnet storing portion, and a buffer member and a pushing member used to fix the permanent magnet are respectively stored in the first area and the second area, and
wherein:
the pushing member and the buffer member are made into one piece, so that the combined piece is inserted into the buffer and other members storing portion.

* * * * *